United States Patent [19]
McClary

[11] Patent Number: 5,199,287
[45] Date of Patent: Apr. 6, 1993

[54] SECURITY DEVICE FOR SECURING A SPARE TIRE
[75] Inventor: Kirby L. McClary, Mesquite, Tex.
[73] Assignee: Adell Corporation, Sunnyvale, Tex.
[21] Appl. No.: 746,993
[22] Filed: Aug. 19, 1991
[51] Int. Cl.$^5$ .................. B62D 43/04; E05B 65/12
[52] U.S. Cl. .................. 70/259; 224/42.21; 224/42.25; 414/463
[58] Field of Search .................. 70/DIG. 57, 259, 260, 70/461; 224/42.06, 42.21, 42.23, 42.25; 414/463; 292/DIG. 60, DIG. 44

[56] References Cited
U.S. PATENT DOCUMENTS

| | | | |
|---|---|---|---|
| 1,837,683 | 12/1931 | Skaggs | 70/260 |
| 1,892,419 | 12/1932 | Best | 70/375 |
| 2,328,301 | 8/1943 | Shaw, Jr. | 70/259 |
| 3,372,821 | 3/1968 | Podhajsky | 70/232 X |
| 3,539,152 | 11/1970 | Paul | 254/166 |
| 4,024,740 | 5/1977 | Di Giovanni | 70/DIG. 57 X |
| 4,152,018 | 5/1979 | Cantrell | 292/305 |
| 4,249,682 | 2/1981 | Yasue et al. | 224/42.23 |
| 4,492,506 | 1/1985 | Hoagland et al. | 414/463 |
| 4,522,325 | 6/1985 | McMillan | 224/42.21 |
| 4,526,021 | 7/1985 | Princell | 70/259 X |
| 4,537,555 | 8/1985 | Combs | 414/463 |
| 4,736,603 | 4/1988 | Brushaber | 70/232 |
| 4,915,358 | 4/1990 | Stallings | 254/323 |
| 4,988,023 | 1/1991 | Heathcoat | 224/42.21 |
| 5,077,995 | 1/1992 | Appelbaum | 70/259 |

Primary Examiner—Lloyd A. Gall
Attorney, Agent, or Firm—Timmons & Kelly

[57] ABSTRACT

A security device is disclosed for securing a spare tire mounted on a hoist having a hoist shaft accessible through an opening in a bumper. The device has a cup that fits over the end of the hoist shaft to prevent access to the hoist shaft. A locking shaft extends from the cup and through the opening in the bumper. A padlock through an aperture on the locking shaft prevents removal of the device. If the device is moved to the rear, the cup prevents the locking shaft from moving out of the opening in the bumper. If the device is moved to the rear, the padlock prevents the cup from being removed from the end of the hoist shaft.

16 Claims, 2 Drawing Sheets

SECURITY DEVICE FOR SECURING A SPARE TIRE

BACKGROUND OF THE INVENTION

1. Field of the Invention

This invention relates in general to security devices for securing spare tires. In particular, the invention relates to security devices for securing a spare tire mounted on a hoist having a hoist shaft accessible through an opening in a bumper.

2. Description of the Prior Art

The security device of the invention is designed for use on a spare tire carrier of the type having a hoist on which the spare tire is mounted under the rear of a vehicle. Such a spare tire carrier is disclosed in U.S. Pat. No. 4,988,023, issued on Jan. 29, 1991, to Heathcoat. A hoist shaft extends from the hoist toward the rear of the vehicle, and is accessible through an opening in the rear bumper. A crank can be inserted through the opening to engage the end of the hoist shaft. As the crank is turned, the hoist raises or lowers the spare tire.

Heathcoat discloses a security device for securing the spare tire on such a hoist. The Heathcoat device has a rotatable housing removably locked on the end of the hoist shaft. The housing prevents engagement of the end of the hoist shaft with a crank. The housing can be unlocked and removed to allow the crank to engage the hoist shaft.

SUMMARY OF THE INVENTION

The security device of the invention has a cylindrical cup that fits over the end of the hoist shaft to prevent access to the hoist shaft. The cup has an open end and a closed end, the closed end being to the rear. A locking shaft extends rearward from the closed end of the cup through the opening in the bumper.

A padlock can be inserted through an aperture in the locking shaft to prevent the security device from being removed from the hoist shaft. The distance from the open end of the cup to the aperture in the shaft is greater than the distance from the end of the hoist shaft to the bumper. Therefore, when the padlock is in place, the security device cannot be moved rearward far enough for the cup to clear the end of the hoist shaft.

When the padlock has been removed, the security device can be removed from the hoist shaft by moving the device rearward until the cup clears the end of the hoist shaft. The device can then be moved forward to remove the locking shaft from the opening in the bumper.

The above, as well as additional objects, features, and advantages of the invention, will become apparent in the following detailed description.

DESCRIPTION OF THE PREFERRED EMBODIMENT

Figure 1:
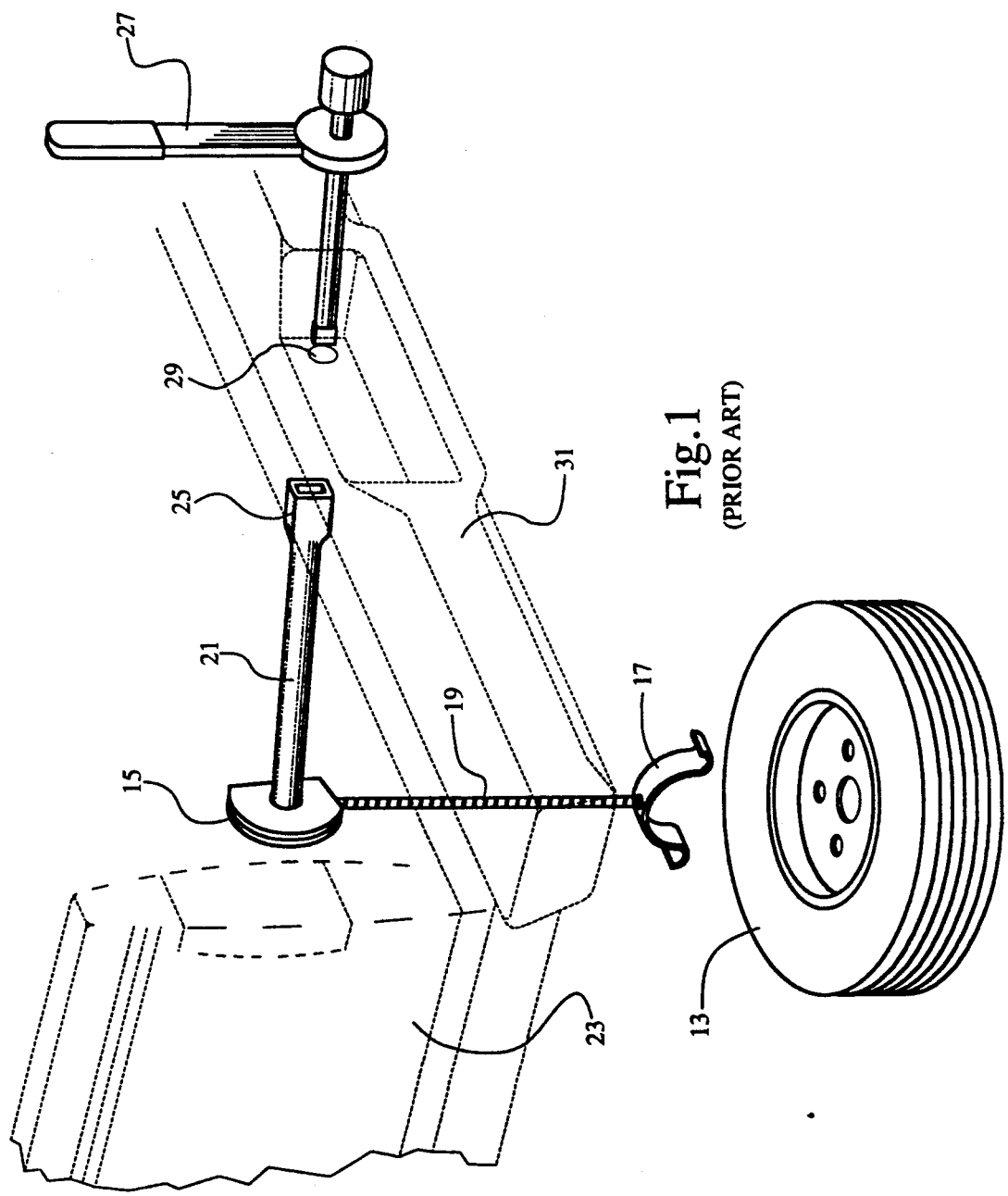
FIG. 1 is a perspective view of the rear end of a truck having a spare tire mounted on a hoist of the type having a hoist shaft accessible through an opening in the rear bumper.

The security device 11 of the invention is designed to secure a spare tire 13 mounted on a hoist 15, as shown in FIG. 1. The tire 13 is suspended from the hoist 15 on a retainer 17 on the lower end of a cable 19.

A hoist shaft 21 extends from the hoist 15 toward the rear of the vehicle 23. The end 25 of the hoist shaft 21 is flared in order to be engaged with a ratchet 27 or another type of crank by inserting the ratchet 27 through an opening 29 in the rear bumper 31 of the vehicle 23. When the end 25 of the hoist shaft 21 is engaged by a ratchet 27, the spare tire 13 can be raised or lowered by turning the hoist shaft 21 with the ratchet 27.

Figure 2:
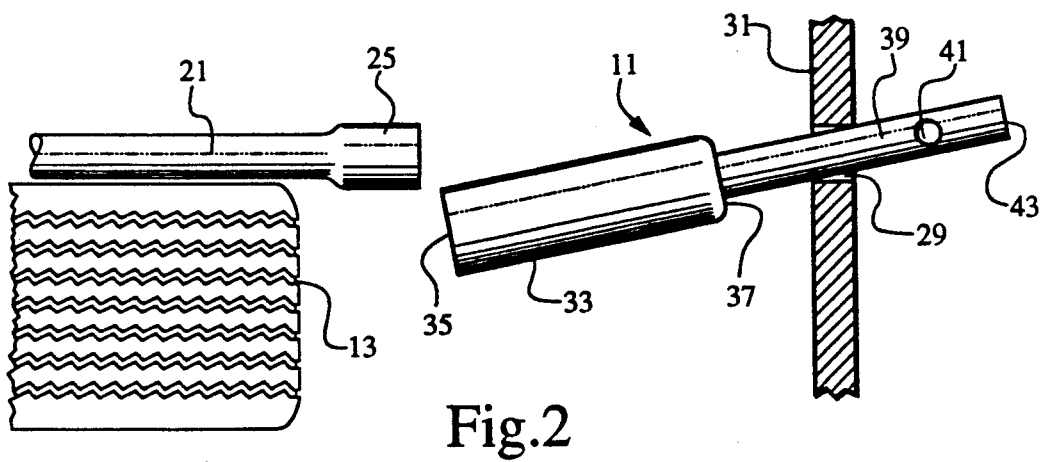
FIG. 2 is a side elevation of the security device of the invention being inserted through the opening in the rear bumper during installation of the device on the end of the hoist shaft.
Figure 3:
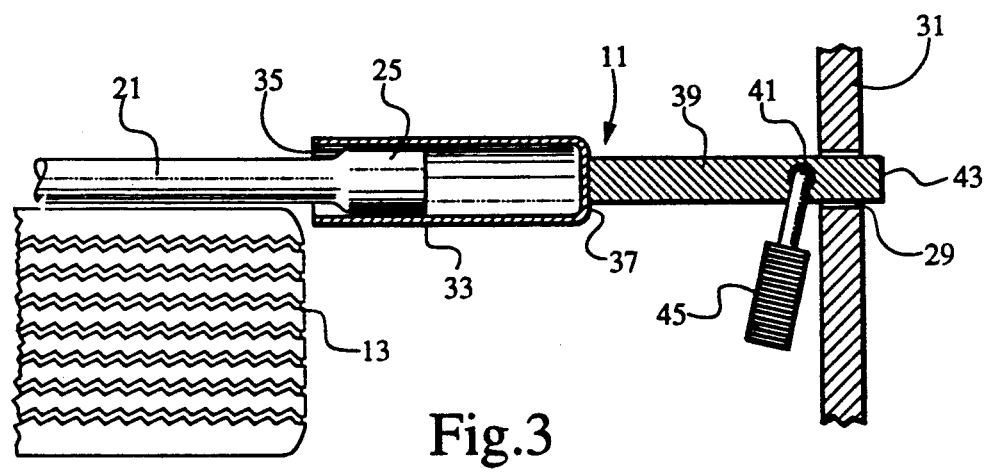
FIG. 3 is a cross-sectional side elevation of the security device of the invention installed on the hoist shaft.

In a typical truck, the end 25 of the hoist shaft 21 may be approximately six inches from the bumper 31. When the spare tire 13 is in its raised position, as shown in FIGS. 2 and 3, the spare tire 13 is located directly below the hoist shaft 21 and, in a typical truck, may be approximately eight inches from the rear bumper 31. In a typical long bed truck, the end 25 of the hoist shaft 21 may be closer to about eleven inches from the bumper 31, and the spare tire 13 may be about thirteen inches from the bumper 31.

FIGS. 2 and 3 illustrate the preferred embodiment of the security device 11 of the invention. The device 11 has a cylindrical cup on one end. The cup 33 has an open end 35 and a closed end 37. The inner diameter of the cup 33 is larger than the flared end 25 of the hoist shaft 21, so that the cup 33 can cover the end 25 of the hoist shaft 21. For example, for a standard hoist shaft 21, the inner diameter of the cup 33 will be approximately 1.5 inches.

The length of the cup 33, from the open end 35 to the closed end 37, is approximately four inches. The length of the cup 33 must be sufficient to cover the all of the hoist shaft 21 that extends beyond the spare tire 13, as shown in FIG. 3.

The security device 11 also has a locking shaft 39 extending from the center of the closed end 37 of the cup 33. The locking shaft 39 is about 5.5 inches long, and has a diameter of about 0.75 inch.

An aperture 41, of about 0.5 inch diameter, is drilled through the locking shaft 39 approximately 1.5 inches from the distal end 43 of the shaft 39. The distance from the open end 35 of the cup 33 to the aperture 41 in the locking shaft 39 is about eight inches. This distance is approximately equal to the distance from the spare tire 13 to the bumper 31, which is typically about eight inches.

Figure 4:
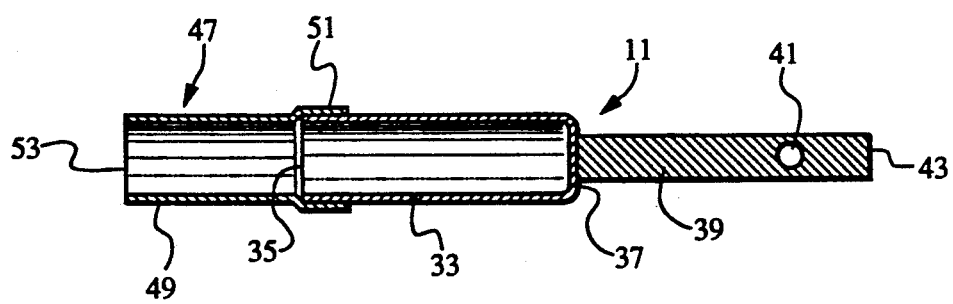
FIG. 4 is a cross-sectional side elevation of the security device of the invention including the extension.

A padlock 45 can be inserted through the aperture 41 as shown in FIGS. 3 and 4. Any common padlock 45 having a link that is smaller than the aperture 41 can be used. The padlock 45 can be installed or removed from the aperture 41 by reaching under the bumper 31.

If the vehicle with which the security device 11 is to be used is a long bed truck, the spare tire 13 may be about thirteen inches from the bumper 31. The length of the security device 11 must be extended to compensate for the increased distance between the spare tire 13 and the bumper 31.

As shown in FIG. 5, an extension 47 can be inserted onto the open end 35 of the cup 33 to extend the overall length of the device 11 by approximately five inches.

The extension 47 has a cylindrical portion 49 that is about five inches long. The extension 47 also has an expanded portion 51 on one end of the cylindrical portion 49. The expanded portion 51 is about 0.75 inch long and has an inner diameter of about 1.76 inches. Thus, the open end 35 of the cup 33, which has an outer diameter of about 1.75 inches, can fit snugly within the inner diameter of the expanded portion 51 of the extension 47, as seen in FIG. 5. When the extended security device 11 is thus extended, the distance from the open end 53 of the extension 47 to the aperture 41 in the locking shaft 39 is about thirteen inches.

The operation of the security device 11 of the invention is illustrated by FIGS. 2 and 3. FIG. 2 shows how the device 11 is installed. The locking shaft 39 of the device 11 is inserted through the opening 29 in the bumper 31, until the open end 35 of the cup 33 passes the end 25 of the hoist shaft 21. The cup 33 is then placed over the end 25 of the hoist shaft 21, until the open end 35 of the cup 33 is adjacent to the spare tire 13, as seen in FIG. 3. In this position, the cup 33 covers all of the hoist shaft 21 that extends past the spare tire 13.

The padlock 45 is then placed through the aperture 41 in the locking shaft 39 and closed. When the padlock 45 is locked on the locking shaft 39, the security device 11 cannot be removed from the hoist shaft 21. The open end 35 of the cup 33 abuts the spare tire 13 and prevents forward movement of the security device 11. The padlock 45 is located adjacent to the rear bumper 31 and prevents rearward movement of the security device 11. Since the distance between the open end 35 of the cup 33 and the aperture 41 is greater than the distance between the end 25 of the hoist shaft 21 and the bumper 31, the security device 11 cannot be removed without removing the padlock 45.

The device 11 can be easily removed once the padlock 45 has been removed. The device 11 is moved to the rear until the cup 33 is no longer held by the end 25 of the hoist shaft 21. The cup 33 is then moved to one side, and the device 11 is removed from the opening 29 in the bumper 31.

The security device 11 of the invention has several advantages over the prior art. Not only does the cup 33 prevent engagement of the end 25 of the hoist shaft 21 with a crank 27, but the cup 33 also covers the remainder of the hoist shaft 21 that extends beyond the spare tire 13. Thus, the cup 33 also prevents engagement of the hoist shaft 21 with a pair of pliers or other tool that could be used to rotate the hoist shaft 21. The security device 11 can rotate independently of the hoist shaft 21, so rotating the security device 11 does not raise or lower the spare tire 13.

Further, the device 11 is easy to install and remove, and can be locked with a simple padlock 45. The device 11 is inexpensive to manufacture and requires no maintenance, having no moving parts. Additionally, the device 11 can be easily adapted to fit long bed trucks as well as standard trucks.

The invention has been shown in only one embodiment. It should be apparent to those skilled in the art that the invention is not so limited, but is susceptible to various changes and modifications without departing from the spirit of the invention.

I claim:

1. A security device for securing a spare tire mounted on a hoist having a hoist shaft accessible through an opening in a bumper, comprising:

a cover for blocking access to the end of the hoist shaft, wherein the cover can be removed from the end of the hoist shaft by moving the cover a sufficient distance toward the bumper, and wherein the cover is a cup that fits over the end of the hoist shaft;

a locking shaft extending from the cover through the opening in the bumper; and locking means for selectively preventing movement of the cover to a position in which the cover can be removed from the end of the hoist shaft.

2. A security device as recited in claim 1, wherein the locking means is a removable padlock extending through an aperture through the locking shaft.

3. A security device as recited in claim 1, further comprising an extension for extending the length of the security device for use on vehicles in which the spare tire is farther away from the bumper.

4. A security device as recited in claim 1, wherein the cup covers all of the hoist shaft that extends beyond the spare tire.

5. A security device as recited in claim 1, wherein the cup has an open end and a closed end, and the locking shaft extends from the closed end of the cup.

6. A security device as recited in claim 5, wherein the locking shaft has an aperture, and the distance from the open end of the cup to the aperture in the locking shaft is greater than the distance from the end of the hoist shaft to the bumper.

7. A security device for securing a spare tire mounted on a hoist having a hoist shaft accessible through an opening in a bumper, comprising:

a cover for blocking access to the end of the hoist shaft, wherein the cover can be removed from the end of the hoist shaft by moving the cover a sufficient distance toward the bumper, wherein the cover is a cup that fits over the end of the hoist shaft;

a locking shaft extending from the cover through the opening in the bumper; and locking means for selectively preventing movement of the cover to a position in which the cover can be removed from the end of the hoist shaft, wherein the locking means is a removable padlock extending through an aperture through the locking shaft.

8. A security device as recited in claim 7, wherein the cup covers all of the hoist shaft that extends beyond the spare tire.

9. A security device as recited in claim 7, wherein the cup has an open end and a closed end, and the locking shaft extends from the closed end of the cup.

10. A security device as recited in claim 9, wherein the distance from the open end of the cup to the aperture in the locking shaft is greater than the distance from the end of the hoist shaft to the bumper.

11. A security device for securing a spare tire mounted on a hoist having a hoist shaft accessible through an opening in a bumper, comprising:

a cylindrical cup for blocking access to the hoist shaft, wherein the cup can be removed from the end of the hoist shaft only by moving the cup a sufficient distance toward the bumper;

a locking shaft extending from the cup through the opening in the bumper, the locking shaft having an aperture; and a padlock removably secured through the aperture in the locking shaft for preventing movement of the security device to a position in which the cup can be removed from the end of the hoist shaft.

12. A security device for securing a spare tire on a hoist under a vehicle, comprising:
   a rear bumper mounted on the vehicle;
   a hoist mounted under the vehicle for raising and lowering the spare tire;
   a hoist shaft extending from the hoist toward the rear of the vehicle and having a rear end for engagement with a crank inserted through an opening in the rear bumper for rotation of the hoist shaft;
   a cover over the end of the hoist shaft, for blocking engagement of the rear end of the hoist shaft with a crank to prevent rotation of the hoist shaft, wherein the cover can be removed from the end of the hoist shaft only by moving the cover a sufficient distance toward the rear bumper;
   a locking shaft connected to and extending rearward from the cover and extending through the opening in the rear bumper, the locking shaft having an aperture through a portion of the locking shaft adjacent the inner surface of the bumper; and
   a padlock secured through the aperture through the locking shaft for preventing removal of the cover from the end of the hoist shaft unless the padlock is first removed from the locking shaft.

13. A security device as recited in claim 12, wherein the cover covers all of the hoist shaft that extends beyond the spare tire.

14. A security device as recited in claim 12, wherein the cover has an open end and a closed end, and the locking shaft extends from the closed end of the cover.

15. A security device as recited in claim 14, wherein the distance from the open end of the cover to the aperture in the locking shaft is greater than the distance from the end of the hoist shaft to the inner surface of the bumper.

16. A security device as recited in claim 12, further comprising an extension for extending the length of the security device for use on vehicles in which the spare tire is farther away from the bumper.

* * * * *